United States Patent
Kalajan et al.

(10) Patent No.: US 12,468,800 B1
(45) Date of Patent: Nov. 11, 2025

(54) COMPUTER-IMPLEMENTED SYSTEM THAT ENABLES DETECTION OF FRAUDULENT GPS COORDINATES PROVIDED DURING MEDIA COLLECTION FOR INSPECTIONS PERFORMED VIA MOBILE DEVICES

(71) Applicant: VuSpex Inc., Watsonville, CA (US)

(72) Inventors: Kevin Kalajan, Arroyo Grande, CA (US); Dane Demicell, Watsonville, CA (US)

(73) Assignee: VuSpex Inc., Watsonville, CA (US)

( * ) Notice: Subject to any disclaimer, the term of this patent is extended or adjusted under 35 U.S.C. 154(b) by 0 days.

(21) Appl. No.: 19/173,767

(22) Filed: Apr. 8, 2025

Related U.S. Application Data

(60) Provisional application No. 63/739,593, filed on Dec. 29, 2024.

(51) Int. Cl.
  *G06F 21/45* (2013.01)
  *G06F 21/00* (2013.01)

(52) U.S. Cl.
  CPC ...... *G06F 21/45* (2013.01); *G06F 2221/2111* (2013.01)

(58) Field of Classification Search
  CPC .......... G06F 21/45; G06F 21/30; G06F 21/55; G06F 21/552; G06F 21/577; G06F 21/60; G06F 2221/2111; H04L 63/14; H04L 63/1433
  See application file for complete search history.

(56) References Cited

U.S. PATENT DOCUMENTS

| | | |
|---|---|---|
| 7,639,943 B1 | 12/2009 | Kalajan |
| 8,385,950 B1 | 2/2013 | Wagner |
| 8,418,231 B2 | 4/2013 | Denny |
| 8,665,337 B2 | 3/2014 | Mikawa |
| 8,818,018 B2 | 8/2014 | Simske |
| 10,402,064 B1 | 9/2019 | Al-Sallami |
| 10,796,374 B1 | 10/2020 | Cuttell |
| 10,878,388 B2 | 12/2020 | Wang et al. |
| 11,163,941 B1 | 11/2021 | Al Majid |
| 11,190,679 B2 | 11/2021 | Ebsen |
| 11,228,551 B1 | 1/2022 | Baron |
| 11,361,423 B2 | 6/2022 | Toth et al. |
| 11,963,072 B2 | 4/2024 | Kalajan |
| 2012/0249832 A1* | 10/2012 | Okamoto ........... H04N 1/32112 348/E5.031 |
| 2016/0267270 A1 | 9/2016 | Lee |
| 2017/0332421 A1 | 11/2017 | Sternberg |
| 2022/0197620 A1 | 6/2022 | Vihar |
| 2023/0247393 A1 | 8/2023 | Kalajan |

(Continued)

*Primary Examiner* — Edward Zee
(74) *Attorney, Agent, or Firm* — Clause Eight; Michael Catania

(57) ABSTRACT

A computer-implemented system and method that enables the detection of fraudulent GPS coordinates provided during media collection for an inspection performed via a mobile device are disclosed herein. The system includes a fraud engine running on a public-facing web server/service (PFWS), and a field agent mobile device comprising a camera. The fraud engine is also configured to generate a fraudulent gradient of authenticity (FGA) for the inspection submission by calculating a ratio of the number of unique GPS coordinates to the total number of image coordinates.

20 Claims, 7 Drawing Sheets

(56) References Cited

U.S. PATENT DOCUMENTS

| | | |
|---|---|---|
| 2023/0269105 A1 | 8/2023 | McGregor et al. |
| 2023/0308499 A1 | 9/2023 | Kalajan |
| 2024/0193754 A1 | 6/2024 | Karaaslan et al. |

\* cited by examiner

COMPUTER-IMPLEMENTED SYSTEM THAT ENABLES DETECTION OF FRAUDULENT GPS COORDINATES PROVIDED DURING MEDIA COLLECTION FOR INSPECTIONS PERFORMED VIA MOBILE DEVICES

CROSS REFERENCE TO RELATED APPLICATION

The Present Application claims priority to U.S. Provisional Patent Application No. 63/739,593, filed on Dec. 29, 2024, which is hereby incorporated by reference in its entirety.

STATEMENT REGARDING FEDERALLY SPONSORED RESEARCH OR DEVELOPMENT

Not Applicable

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and disclosure as described below and to the drawings that form a part of this document: Copyright 2024, Kevin Kalajan, Dane Demicell, and VuSpex Inc. All Rights Reserved.

BACKGROUND OF THE INVENTION

Field of the Invention

This patent application relates to the field of inspection software, mobile devices, network media and data communications, and mobile device "apps" in the various example embodiments disclosed herein.

Description of the Related Art

The Prior Art Discusses

Over the past ten years, the Internet (public networking) has been used to upload multimedia content from a mobile device to various web services. For example, an insurance company may allow an insured to upload photos or other content related to damage to their vehicle as proof, instead of an adjuster personally visiting the vehicle.

Furthermore, in the past 5 years, inspection departments from Community Development public agencies and private sector companies are increasingly allowing live (and non-live) virtual inspections vs. in-person inspections for a variety of domain-specific content and use cases.

U.S. Pat. No. 10,796,374 references the use of aerial images to conduct a virtual inspection based on an inspection model within a time threshold.

U.S. Pat. No. 11,963,072 references a way to initiate a mechanism to upload images via MMS in cases of poor connectivity.

US Patent Publication Number 20230269105 references a way to authenticate an image taken on a device to ensure it is not forged but in no way handles verification of the GPS coordinates provided an image (EXIF) header are valid, including distinct metadata that would describe the GPS coordinates of where an image was taken/captured.

In summary, these patents and other related conventional technologies do not provide a system or method for automatically determining if the GPS coordinates provided with a series of images or videos are fraudulent (GPS coordinates that do not match where the content was actually captured). This invention provides the ability to determine if the GPS coordinates were fraudulent as a result of an App being installed on the device that spoofs GPS coordinates—and provides a mechanism to give a gradient level of confidence (e.g., highly fraudulent to possibly fraudulent). Thus, a computer-implemented system and method that enables a mechanism to detect fraudulent GPS coordinates is needed.

BRIEF SUMMARY OF THE INVENTION

One aspect of the present invention is a computer-implemented method that enables the detection of fraudulent GPS coordinates provided during media collection for an inspection performed via a mobile device. The method includes collecting, at a fraud engine running on a public-facing web server/service (PFWS), a plurality of image coordinates for an inspection submission. Each of the plurality of image coordinates comprising GPS coordinates and a timestamp value for an image generated by a mobile device of a field agent at an inspection site. The method also includes sorting the plurality of image coordinates by time ascending created at the inspection site. The method also includes determining a number of unique GPS coordinates for the plurality of image coordinates by comparing the GPS coordinates of each of the plurality of image coordinates. The method also includes determining a total number of image coordinates of the plurality of image coordinates. The method also includes generating a fraudulent gradient of authenticity (FGA) for the inspection submission by calculating a ratio of the number of unique GPS coordinates to the total number of image coordinates.

Another aspect of the present invention is a computer-implemented system that enables the detection of fraudulent GPS coordinates provided during media collection for an inspection performed via a mobile device, The system includes a fraud engine running on a public-facing web server/service (PFWS), and a field agent mobile device comprising a camera. The fraud engine is configured to collect from the field agent mobile device a plurality of image coordinates for an inspection submission. Each of the plurality of image coordinates comprising GPS coordinates and a timestamp value for an image generated by a mobile device of a field agent at an inspection site. The fraud engine is also configured to sort the plurality of image coordinates by time ascending created at the inspection site. The fraud engine is also configured to determine a number of unique GPS coordinates for the plurality of image coordinates by comparing the GPS coordinates of each of the plurality of image coordinates. The fraud engine is also configured to determine a total number of image coordinates of the plurality of image coordinates. The fraud engine is also configured to generate a fraudulent gradient of authenticity (FGA) for the inspection submission by calculating a ratio of the number of unique GPS coordinates to the total number of image coordinates.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

In the disclosed example embodiments, a computer-implemented system 1000 and method 4000 manage the review of GPS coordinates supplied for an inspection and arrives at a metric or gradient (confidence level) about whether the GPS coordinates are accurate or not.

Figure 1:
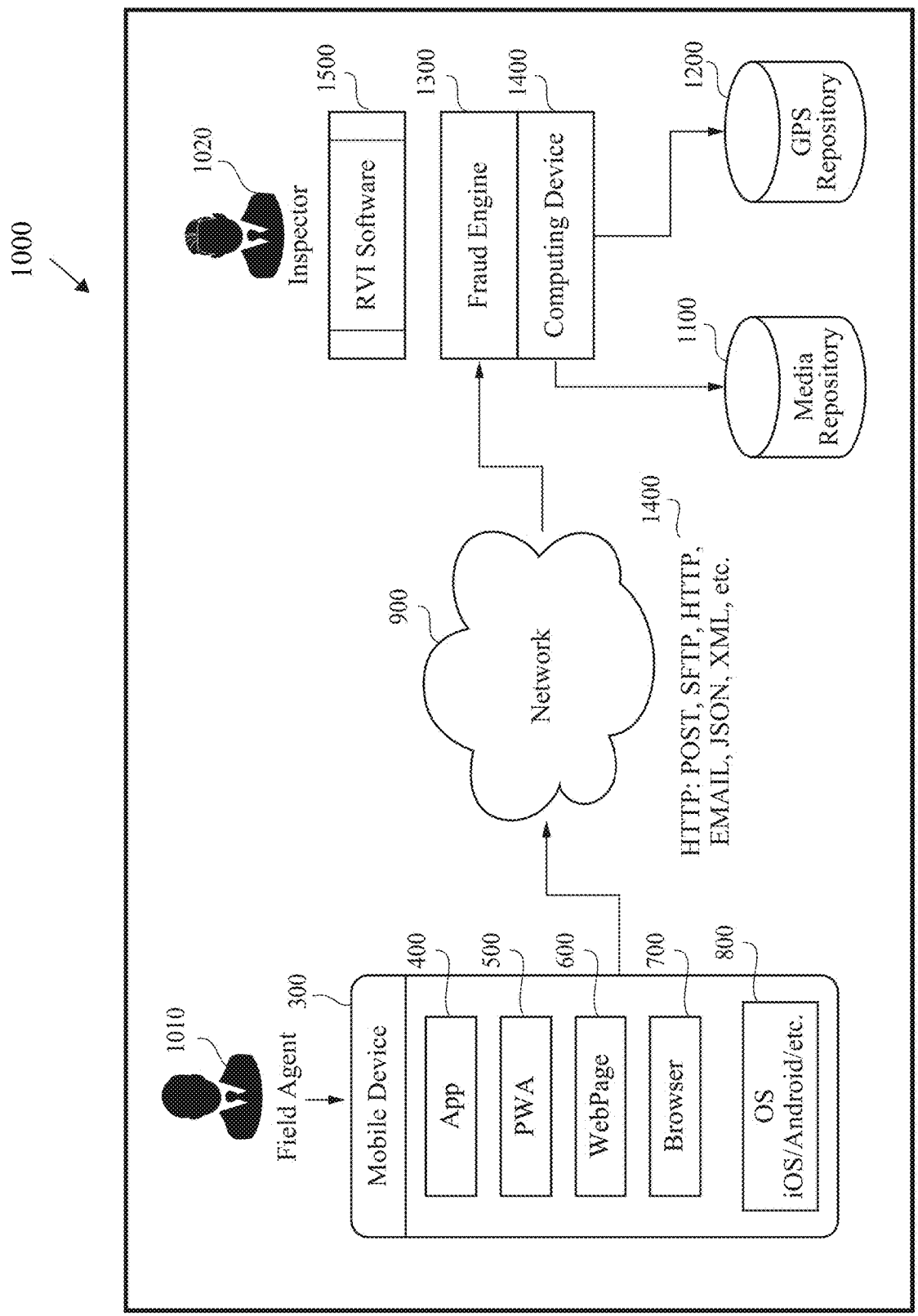
FIG. 1 is a block diagram of a system that enables the detection of fraudulent GPS coordinates provided during media collection for an inspection performed via a mobile device.

FIG. 1 shows a system 1000 for automatically detecting the level of authenticity of GPS coordinates for media supplied for an inspection. The system 1000 comprises of a fraud engine 1300 running on a public-facing web server and a field agent 1010 mobile device 300 with a camera. The fraud engine 1300 collects, sorts, compares, and counts images with GPS coordinates and timestamps for an inspection submission, and then calculates a fraudulent gradient of authenticity (FGA).

Alternatively, the fraud engine 1300 runs on an application of a mobile device.

In one embodiment, the GPS coordinates 1200 can be provided in the EXIF header of a JPEG (or equivalent header of an analogous image file such as GIF, JFIF, PNG, MP4 video, MPE3 audio, etc.). In another embodiment, it may be meta information that is distinct from the binary object representing the media content 1100 where the GPS coordinates might be provided. In one embodiment this can be an HTTP POST request to a server with the binary image content as part of the data and latitude and longitude as part of other POST web form elements or data fields, perhaps encoded in JSON, XML or analogous mechanisms (computing device 1400).

In yet another embodiment, the GPS coordinates might be retrieved under a separate process and stored in a relational database (or other key-value storage system, or any other RDBMS or NoSQL database, etc.) that associates a given media item for an inspection with its corresponding GPS coordinates 1200.

While in one embodiment the images are captured by a Field Agent ("FA") 1010 and sent electronically (SMS, HTTP, EMAIL, SFTP, etc., 1400, in another embodiment the media is captured by an Inspector 1020 in real-time, such as taking snapshots during a live video stream with purpose-built remote video inspection software ("RVI") 1500 that simultaneously delivers the media and tracks the GPS coordinates of the media in real-time for each snapshot taken. Alternatively, the Inspector 1020 could be using a telephony-based service for audio connection (e.g., landline or cell phone call) while the FA 1010 uses a web-based service or phone 300 App 400 to send in photos in real-time to an Inspector dashboard and the Inspector 1020 tells the FA 1010 what photos are required and sees them in real-time along with their associated GPS coordinates.

The GPS coordinates can contain but are not limited to, latitude, longitude, altitude above sea-level, compass direction, and other relational coordinates. Only latitude and longitude are required as inputs to the present invention.

In one embodiment, the use of latitude and longitude are simply enough to determine authenticity since the latitude ("LAT") and longitude ("LONG") together identify a point on a map on the earth and thereby ensure an Inspector performing an inspection from media retrieved from an arbitrary third party represents the accurate location of where the content was captured.

There are two primary ways that LAT and LONG can be captured on a mobile device 300. The first is by using an App 400 (program written for iOS, Android and other mobile operating systems 800). The other typical way is using Javascript (or equivalent browser-supported language) in a web browser 700 page 600 (or Progressive Web App "PWA") 500, as shown in FIG. 1.

In either of the embodiments above, the underlying software that captures the image must make a request to get the current GPS coordinates. In reference to FIG. 2, in the case of an APP 2120, the request goes to the operating system 2160 of the mobile device 2110. In the case of a web page 2140, PWA 2130, or browser extension, the request goes to the browser 2150 (e.g. in Javascript, navigator.getLocation ( ). In this case, the browser 2150 then queries the operating system 2160 (since the browser is simply an App on a mobile device).

With nothing perturbing the system, the GPS coordinates are as accurate as the operating system 2160 can supply, given connections to a cell tower 2220, GPS satellite 2200, and cable modem 2210, among other future ways to derive the user's current GPS position.

Typically, a request can allow options for caching, accuracy (high or low), recency, etc., but in all cases the values will be as accurate as the phone, the related hardware (GPS chips), and the networks can provide.

However, mobile devices 2110 allow Apps to be installed, and there are Apps capable of spoofing the GPS coordinates 2300 so that a user may make themselves appear in a location they are not really at. There are a number of valid use cases for this (e.g., testing) and a number of nefarious use cases for this, which are beyond the scope of the invention.

It is incredibly important for an Inspector to know that the GPS coordinates of media supplied to them are not accurate, as this could weigh heavily on outcomes of insurance, building, construction, etc., if the content is not authentic to where it is believed to be sourced from.

In order to detect the use of an App that is spoofing GPS coordinates 2300, it is important to understand that GPS chips 2170 on mobile devices 2110 are continuing to sample the current location at a frequent interval. Therefore, even if an individual holding a phone doesn't take any steps, the phone in their hand moves slightly, and along with the repeated location analysis by the underlying hardware and accuracy provided by the GPS chips (up to 10 significant digits), multiple photos taken in a single location yield slightly different GPS coordinates.

This is in contrast to the Apps that spoof GPS coordinates 2300. In these cases, the user is asked for specific GPS coordinates to use or perhaps a street address where the APP 2300 will convert the street address entered into GPS coordinates and then spoof the GPS coordinates with those of the street address entered, which means that any other App requesting the device's 2110 GPS coordinates will unknowingly get the spoofed GPS coordinates.

However, these Apps 2300 do not manipulate the GPS coordinates, they keep using the same coordinates each time (unless configured to simulate walking or navigation, which is addressed later in the description). They cannot randomize or simulate changing the GPS coordinates (other than a person traveling on a falsified route, but that is not relevant for inspections) because they don't know at what point (deviation) the changed values would no longer match the desired street address.

And it is a result of this artifact that the invention detects fraudulent addresses.

It should be noted that the spoofing Apps 2300 typically do have the ability to allow the user to configure a route and simulate GPS coordinates changing at a given rate associated with walking or driving to simulate or fool other applications/games where the user is traveling. However, this feature would be useless and nonsensical for a building inspection where movement is not being tracked, instead, the user is stationary in a position taking photos at a single location (they might then move to another location on the jobsite, but future photos will still be at a given location until they move yet again.)

Figure 4:
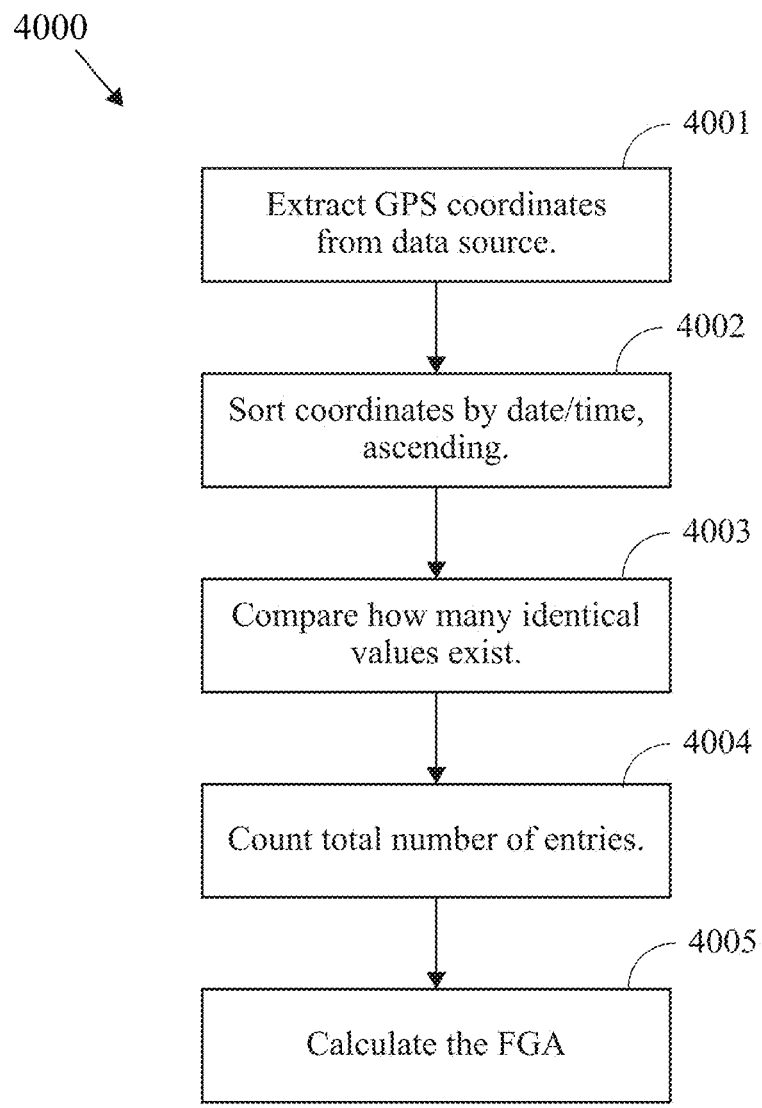
FIG. 4 is a flow chart of a method.

FIG. 4 is a flow chart for a computer-implemented method 4000.

Step 4001 begins by collecting the coordinates provided. The actual binary content of the media captured is not required. Also, timestamps can be useful (see below), but the GPS coordinates themselves are sufficient. Collection can be from a database, CSV, API request, HTTP request, FTP, SFTP, download, etc.

Figure 2:
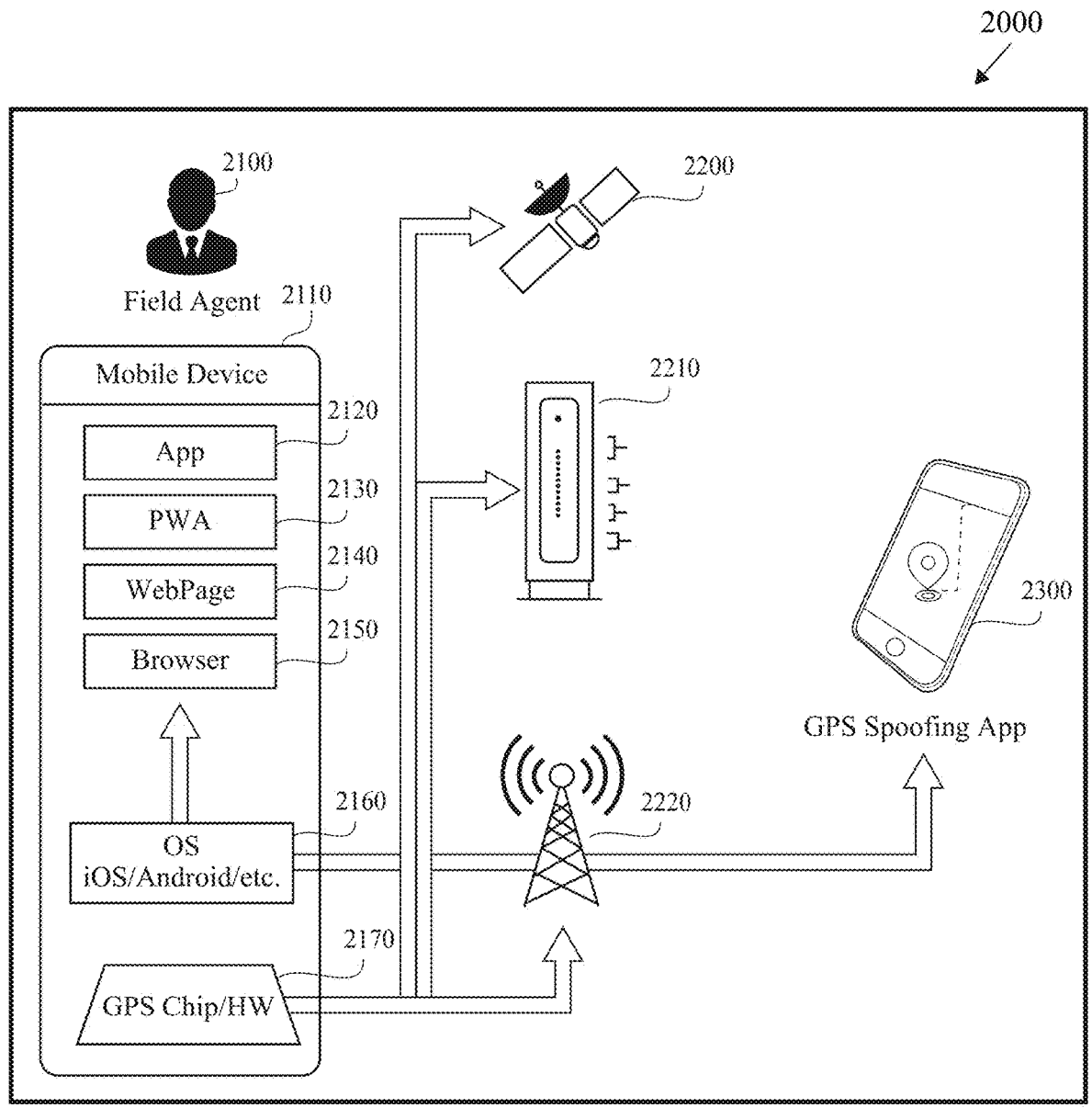
FIG. 2 is a block diagram of components of the system for GPS determination.

In one embodiment, as shown in FIG. 2, a user with a device 2110 takes photos and videos with an APP 2120 or PWA 2130 or webpage 2140 and the underlying software requests GPS coordinates and stores them in the media, or complex object, or metadata.

Figure 3:
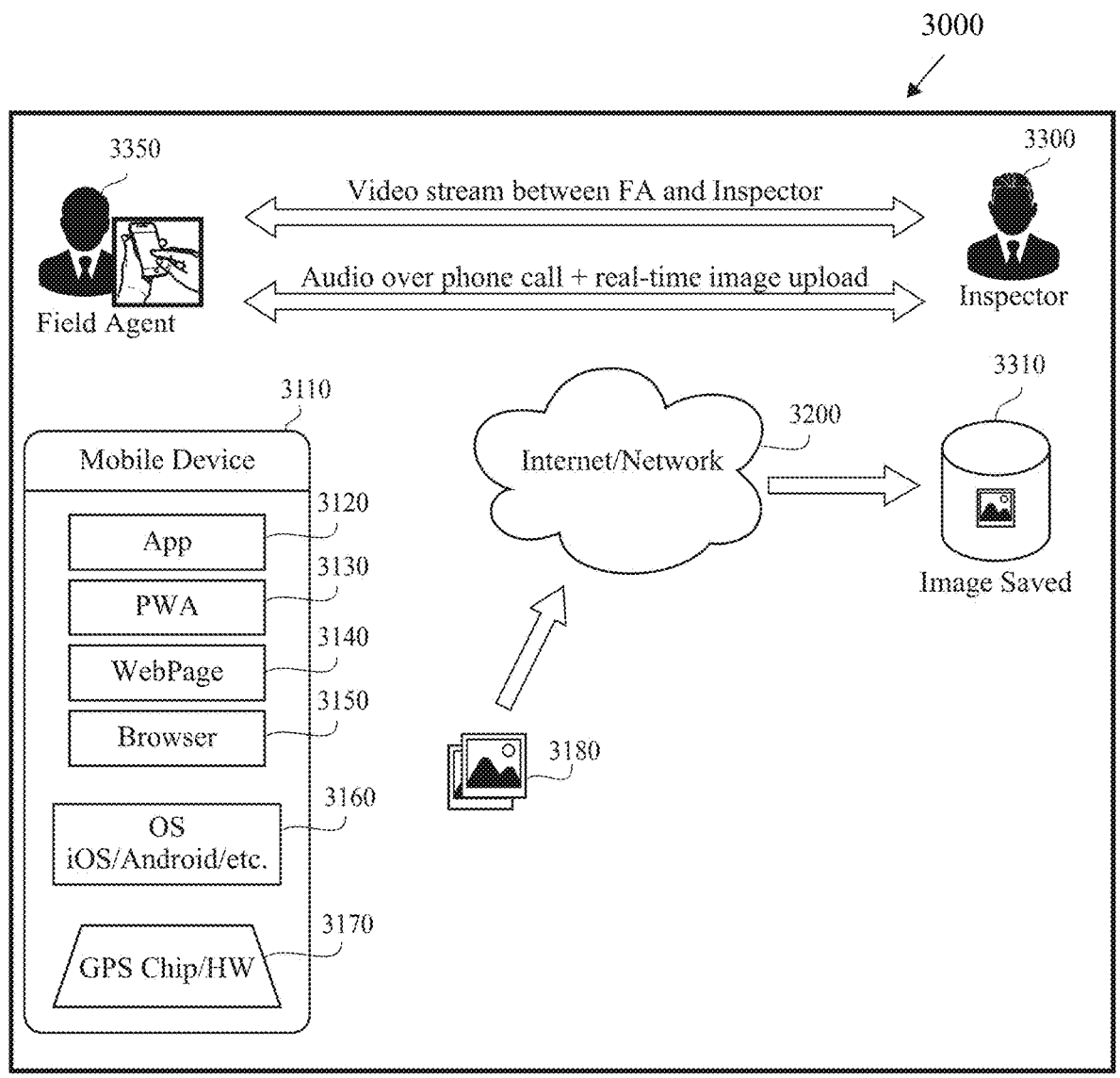
FIG. 3 is a block diagram of a live virtual inspection versus images/videos submitted asynchronously by a field agent.

In another embodiment, as shown in FIG. 3, the inspection is a real-time live "virtual inspection" 3000 where an Inspector 3300 is on a live video stream with a remote user "field agent" 3350, and the Inspector 3300 is capturing images 3180 from the video stream using a screen capture or snapshot feature of the underlying remote inspection software (e.g., VuSpex Virtual Inspection Software, or other analogous competitors of VuSpex). In this case, these software services store the current GPS coordinates of the snapshot and save in a database 3310, and optionally watermark the image (in one embodiment). If a user/field agent 3350 was spoofing the GPS coordinates, the Inspector 3300 would think the user was at one location yet they would actually be in a completely separate/distinct location, thus providing misleading content to the Inspector 3300.

The invention handles both of these cases. Of particular note, in the steps described subsequently, the logic implemented via software (or firmware) can be performed on the mobile device or a server-side (on-prem or cloud-based) computing system. For example, in the case of an App gathering the media content, the App could perform the logical processing steps below and merely send an indicator in the request to the server-component that the submittal may be fraudulent. Whereas the fraudulent analysis processing of the live inspection would most likely be done on the server-side since the Inspector-side is receiving the images with the GPS coordinates and thereby it makes more logical sense to compare the incoming images on the server vs. encumbering the client-side (media capture) device with the relevant logic. In yet another embodiment, the fraudulent analysis processing is done via microservice with a defined API and a dedicated application server or SaaS implementation.

Referring back to the flow chart 4000 of FIG. 4, step 4002 requires sorting the media content by time ascending created at the location of the inspection. This is a straightforward process for anyone skilled in the art.

Figure 7:
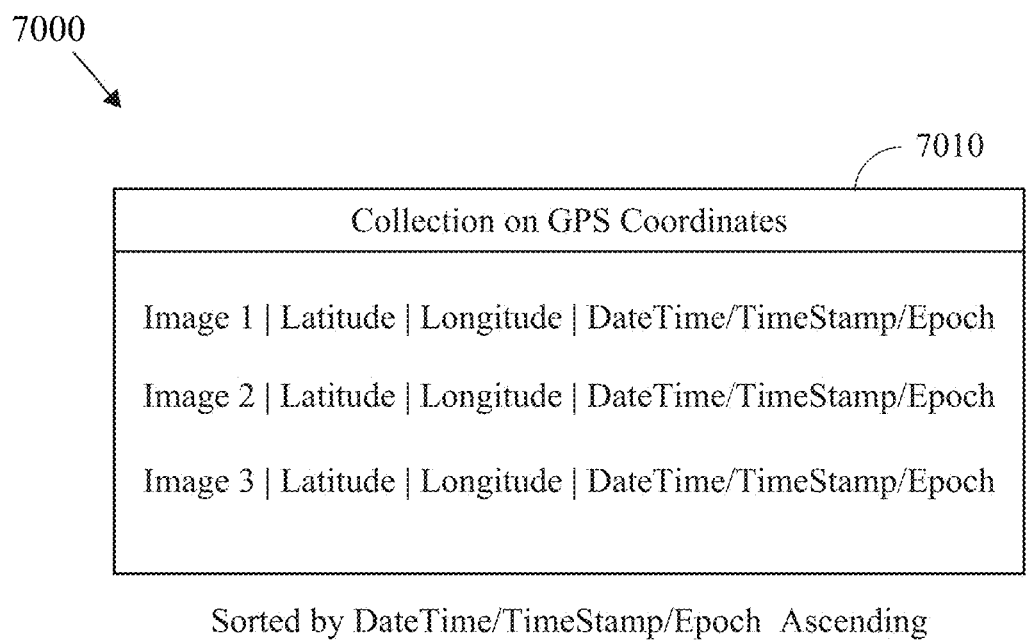
FIG. 7 is a block diagram of a collection of GPS coordinates to be used as part of the fraudulent gradient analysis.

Step 4003 requires going through the GPS coordinates and comparing how many values are identical out of the entire set. FIG. 7 shows a GPS coordinate listing 7000, a generic representation of the data 7010 stored for typical embodiments. This is straightforward for anyone skilled in the art and can be done in a variety of ways, such as by comparing a "sort unique" against the full set vs. the unique set and subtracting the full set element count from the unique set element count, which will provide the number of identical coordinates. For example, if the full set has 20 elements (media items) and the unique set has 1 item (all duplicates), then number of identical values is 20 (out of a total of 20)—hence, all are identical.

Step 4004 requires identifying the total number of values. This is simply counting the number of items in the collection or array.

Step 4005 calculates a ratio that yields the fraudulent gradient of authenticity (FGA). There are a variety of ways to calculate the gradient, and, in fact, in one embodiment there is the degenerate case of only a binary outcome (fraudulent or not-fraudulent). In the binary outcome case, it can be considered a subset of the full gradient (continuum) case as having a gradient of only two values (one at each endpoint). In one embodiment, the greater the number of GPS data points and the smaller number of values skews the ratio to a fraudulent confident level of 100 (the maximum). For example, if there are 100 images and 100 GPS coordinates and they are all the same value, the confidence level is 100 and determined to be highly fraudulent. Alternatively, if there are 100 images and 100 unique/different GPS coordinates, then the fraudulent level would be 0 (not fraudulent at all).

The hybrid case is in between these two endpoint scenarios—where there are 100 images and only 50 unique GPS coordinates. This provides a confidence level of 50%, but this does not equate to "perhaps fraudulent" as it would suggest. Instead, it still correlates to "highly likely fraudulent" as it could mean the user manually changed the GPS coordinates on some but not all of the images.

The reason the size of the dataset of coordinates is important is that it is painstaking for a user to manually change the GPS coordinates each time, and something that is extremely unlikely as an average user would not have the wherewithal to understand, nor the time and patience to do it.

So, if the dataset has 2 GPS coordinates, it is much more likely that a user may have manually changed the coordinates between the 1st and 2nd photo taken. With 100 very unlikely, and with 200 almost impossible.

That is where the timestamps come in. If the timestamps are supplied, the total elapsed time in which the media was captured can be used to plausibly deduce if there was time for a user to manipulate the GPS coordinates each time.

For example, if 120 images were taken for the inspection and the first one was taken at 9:00 AM and the last one was taken at 9:02 AM (one image per second) then it clearly would be impossible for a user to manually change the GPS coordinates each time.

Alternatively, if the user took 120 images over the course of 4 hours (not something someone would ever do for most generic inspection scenarios) then it can be deduced that some of the coordinates, even if not duplicated, were manually entered into the GPS spoofing App. Also, with a large number of images taken over a long period of time, it is likely that two values will be used more than one time and that sometimes a snapshot might be taken without changing the GPS (either due to user error or simply tedium). Essentially, the elapsed time the images were taken can be used to deduce a confidence level of fraudulent coordinates. In summary, calculate the number of images of which the time elapsed (between time taken and the prior image) exceed the amount of time it would take to adjust the coordinates (configurable option) 5030, 5050.

Figure 5:
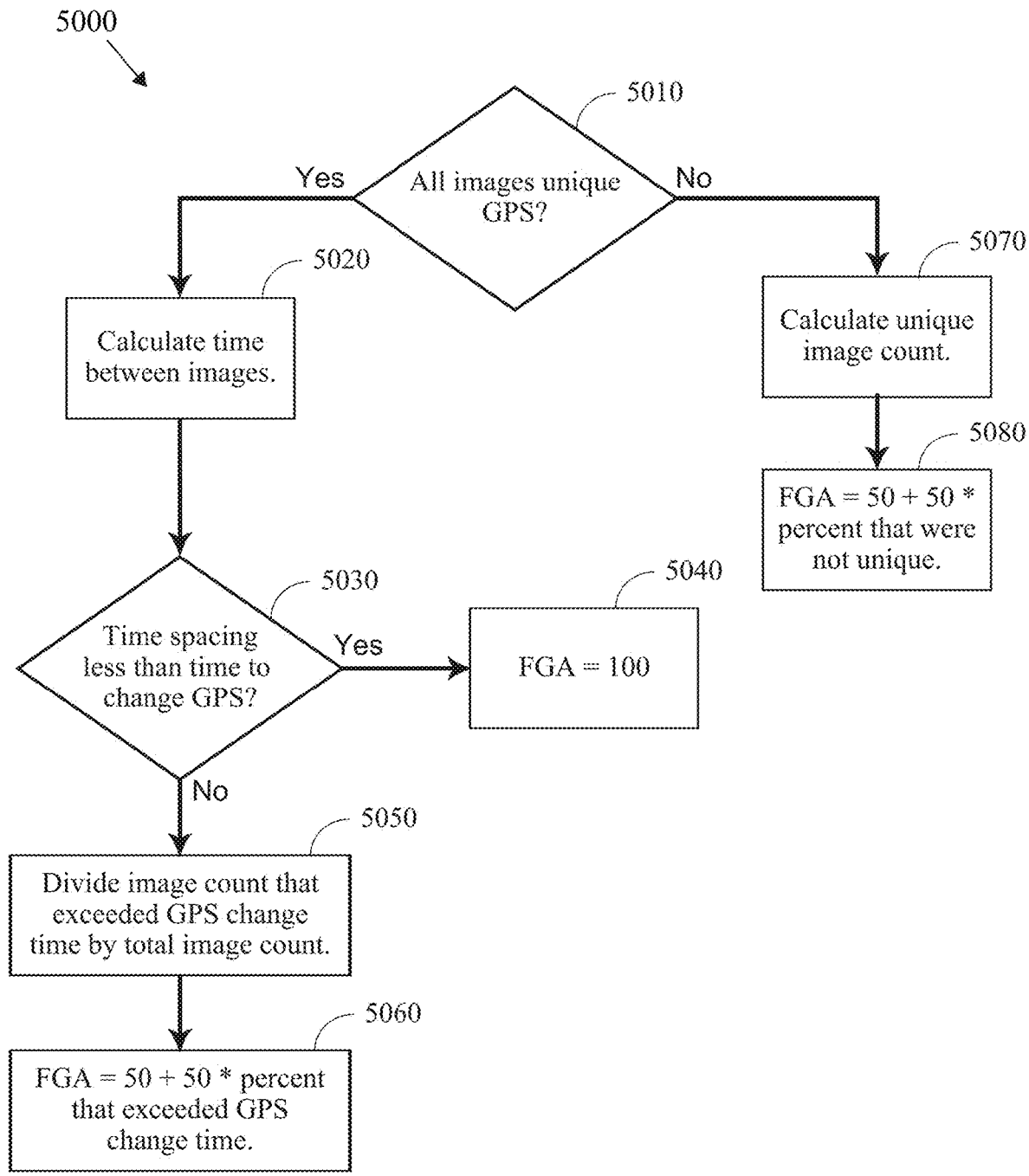
FIG. 5 is a flow chart of the FGA calculation logic.

The logic, in one embodiment, is as follows, in reference to FIG. 5: 1) If all images have the same GPS coordinates 5010, then the FGA is 100 5070, 5080. 2) If all images have unique GPS coordinates 5010 and the time per image 5020 exceeds the expected time to adjust the GPS coordinates 5030 in a GPS spoofing App, then the FGA is between 75 and 100 5050, 5060 (the greater the number of images, the more skewed toward 100).

The invention is future-proof if GPS spoofing Apps, in the future, begin to adjust the coordinates taken using a specific starting address. In theory, at some point in time, App developers of GPS spoofing Apps could randomize or modify the actual coordinates sent for each piece of media by making requests to a reverse geocoding service and ensure that the GPS coordinates fall within the bounds of the address provided. This could be done randomly with a tolerance (distance) away from the starting point or with a more algorithmic approach.

Figure 6:
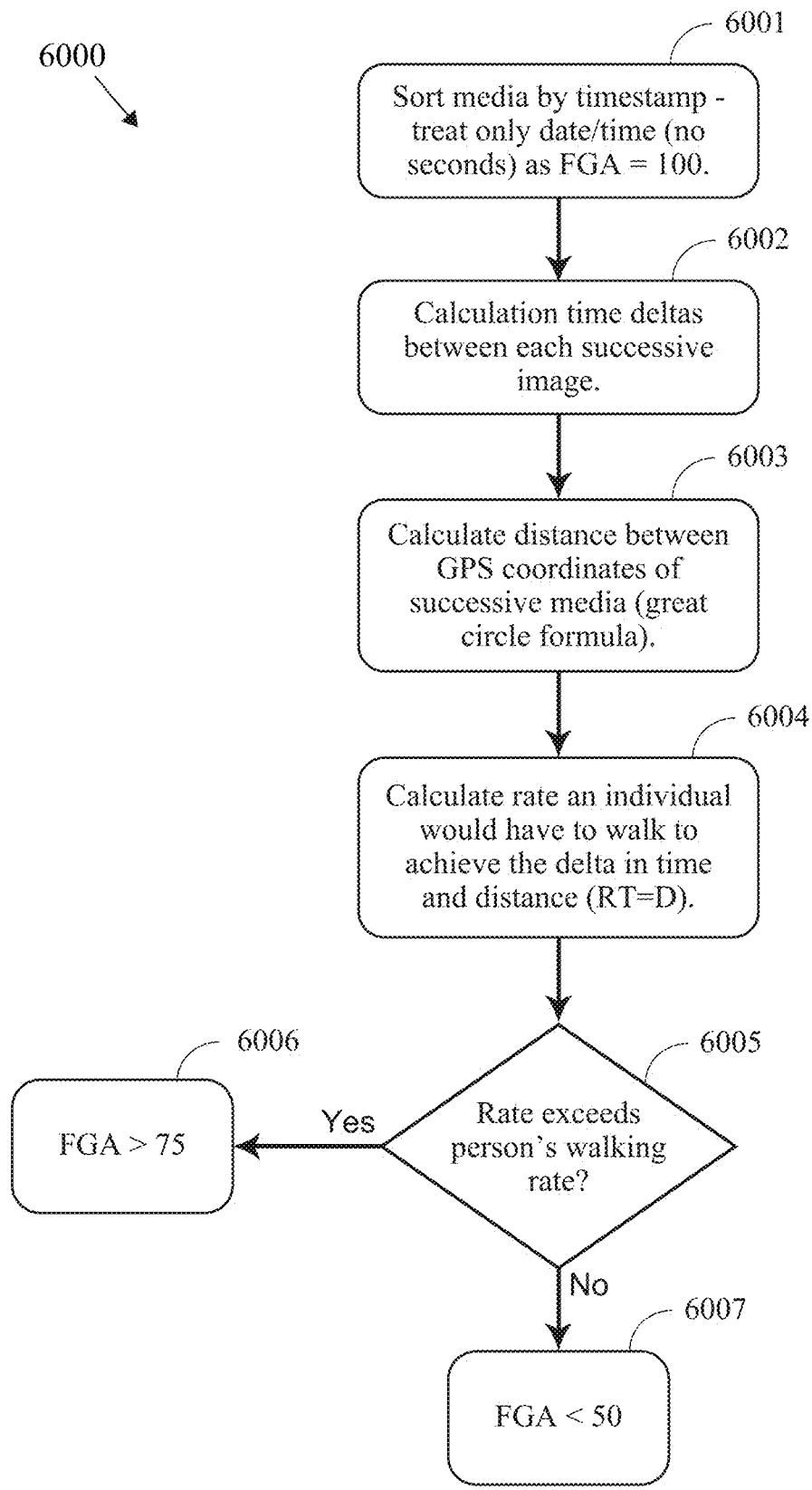
FIG. 6 is a flow chart for a randomization detection.

Either way, the invention addresses falsification by using the timestamps that are associated with media items. Assuming it is an individual walking or standing (vs. a vehicle driving), the invention calculates the distance between the successive GPS coordinates to determine the time it takes for a human to walk the distance. If the rate exceeds 3 miles/hour, it can be assumed that the points are fraudulent. The below algorithm, in one embodiment, demonstrates the complete approach, as shown in the flowchart 6000 of FIG. 6.

Randomization Detection—Step 6001: Sort all the media ascending by timestamp. If only hours and minutes are provided, assume a fraudulent submission unless overridden by other metrics in the invention.

Randomization Detection—Step 6002: Go through each timestamp and compare the difference in time (seconds, to the milliseconds level) between the current image and the subsequent image.

Randomization Detection—Step 6003: Calculate the distance between the GPS coordinates of the current image and the GPS coordinates of the subsequent image. Typically, this is done with the "great circle" algorithm but can be done in a variety of standard ways and is not specific to the invention.

Randomization Detection—Step 6004: Calculate the rate at which the individual would have had to move to achieve the change in distance given the delta in time and distance. Typically, this would use the standard "R times T=D" (rate times time=distance) formula.

Randomization Detection—Step 6005: If the rate calculated exceeds 3 miles per hour, in one embodiment, in at least one case, assume a fraudulent submission 6006. Otherwise, the FGA calculated 6007 is below 50. One case would yield a fraudulent confidence value of 60 and each subsequently found anomaly would raise the fraudulent confidence level by another 10 points, to a maximum of 100, independent of how many media items were provided.

The final option, in one embodiment, is to use the reverse logic to the above to detect that a person stands in the same location and takes several photos, but the GPS coordinates change too dramatically as a function of the time elapsed.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A computer-implemented method comprising:
    collecting, at a fraud engine running on a public-facing web server/service (PFWS), a plurality of image coordinates for an inspection submission, each of the plurality of image coordinates comprising GPS coordinates and a timestamp value for an image generated by a mobile device of a field agent at an inspection site;
    sorting the plurality of image coordinates by time ascending created at the inspection site;
    determining a number of unique GPS coordinates for the plurality of image coordinates by comparing the GPS coordinates of each of the plurality of image coordinates;
    determining a total number of image coordinates of the plurality of image coordinates; and
    generating a fraudulent gradient of authenticity (FGA) for the inspection submission by calculating a ratio of the number of unique GPS coordinates to the total number of image coordinates.

2. The method according to claim 1 further comprising sorting each image corresponding to each of the plurality of image coordinates by ascending timestamp value to determine if the inspection submission was fraudulent.

3. The method according to claim 1 further comprising comparing a difference in the timestamp value for each image corresponding to each of the plurality of image coordinates and a subsequent image to determine if the inspection submission was fraudulent.

4. The method according to claim 1 further comprising calculating a distance between the GPS coordinate of each of the plurality of image coordinates and a subsequent image coordinate to determine if the inspection submission was fraudulent.

5. The method according to claim 1 further comprising calculating a rate at which the field agent would have had to move to achieve a change in distance given the delta in time and distance of the plurality of image coordinates.

6. The method according to claim 1 wherein the GPS coordinates comprise latitude, longitude, altitude above sealevel, and compass direction.

7. The method according to claim 1 wherein each of the GPS coordinates of the plurality of image coordinates are collected from in an EXIF header of a JPEG image.

8. The method according to claim 1 wherein each of the GPS coordinates of the plurality of image coordinates are collected from an HTTP POST request to a server with binary image content as part of the data and latitude and longitude as part of other POST web form elements or data fields.

9. The method according to claim 1 wherein each of the GPS coordinates of the plurality of image coordinates are collected from a relational database that associates a given image for the inspection submission with its corresponding GPS coordinates.

10. The method according to claim 1 wherein each of the GPS coordinates of the plurality of image coordinates are collected in real-time using a telephony-based service for audio connection and a web-based service or phone app is used to transmit required images to an inspector dashboard along with the associated GPS coordinates.

11. A computer-implemented system comprising:
a fraud engine running on a public-facing web server/service (PFWS);
a field agent mobile device comprising a camera;
wherein the fraud engine is configured to collect from the field agent mobile device a plurality of image coordinates for an inspection submission, each of the plurality of image coordinates comprising GPS coordinates and a timestamp value for an image generated by a mobile device of a field agent at an inspection site;
wherein the fraud engine is configured to sort the plurality of image coordinates by time ascending created at the inspection site;
wherein the fraud engine is configured to determine a number of unique GPS coordinates for the plurality of image coordinates by comparing the GPS coordinates of each of the plurality of image coordinates;
wherein the fraud engine is configured to determine a total number of image coordinates of the plurality of image coordinates; and
wherein the fraud engine is configured to generate a fraudulent gradient of authenticity (FGA) for the inspection submission by calculating a ratio of the number of unique GPS coordinates to the total number of image coordinates.

12. The system according to claim 11 wherein the fraud engine is configured to sort each image corresponding to each of the plurality of image coordinates by ascending timestamp value to determine if the inspection submission was fraudulent.

13. The system according to claim 11 wherein the fraud engine is configured to compare a difference in the timestamp value for each image corresponding to each of the plurality of image coordinates and a subsequent image to determine if the inspection submission was fraudulent.

14. The system according to claim 11 wherein the fraud engine is configured to calculate a distance between the GPS coordinate of each of the plurality of image coordinates and a subsequent image coordinate to determine if the inspection submission was fraudulent.

15. The system according to claim 11 wherein the fraud engine is configured to calculate a rate at which the field agent would have had to move to achieve a change in distance given the delta in time and distance of the plurality of image coordinates.

16. The system according to claim 11 wherein each of the GPS coordinates of the plurality of image coordinates are collected from in an EXIF header of a JPEG image.

17. The system according to claim 11 wherein each of the GPS coordinates of the plurality of image coordinates are collected from an HTTP POST request to a server with binary image content as part of the data and latitude and longitude as part of other POST web form elements or data fields.

18. The system according to claim 11 wherein each of the GPS coordinates of the plurality of image coordinates are collected from a relational database that associates a given image for the inspection submission with its corresponding GPS coordinates.

19. The system according to claim 11 wherein each of the GPS coordinates of the plurality of image coordinates are collected in real-time using a telephony-based service for audio connection and a web-based service or phone app is used to transmit required images to an inspector dashboard along with the associated GPS coordinates.

20. A computer-implemented system comprising:
a public-facing web server/service (PFWS);
a field agent mobile device comprising an application and a camera, the application running a fraud engine;
wherein the fraud engine is configured to collect from the field agent mobile device a plurality of image coordinates for an inspection submission, each of the plurality of image coordinates comprising GPS coordinates and a timestamp value for an image generated by a mobile device of a field agent at an inspection site;
wherein the fraud engine is configured to sort the plurality of image coordinates by time ascending created at the inspection site;
wherein the fraud engine is configured to determine a number of unique GPS coordinates for the plurality of image coordinates by comparing the GPS coordinates of each of the plurality of image coordinates;
wherein the fraud engine is configured to determine a total number of image coordinates of the plurality of image coordinates; and
wherein the fraud engine is configured to generate a fraudulent gradient of authenticity (FGA) for the inspection submission by calculating a ratio of the number of unique GPS coordinates to the total number of image coordinates;
wherein the fraud engine is configured to transmit the FGA to the PFWS.

* * * * *